P. J. TWEED.
Picket-Pin.

No. 200,489.      Patented Feb. 19, 1878.

WITNESSES:

INVENTOR:

BY

ATTORNEYS

UNITED STATES PATENT OFFICE.

PETER J. TWEED, OF BLAIR, NEBRASKA.

IMPROVEMENT IN PICKET-PINS.

Specification forming part of Letters Patent No. 200,489, dated February 19, 1878; application filed December 8, 1877.

*To all whom it may concern:*

Figure 1:
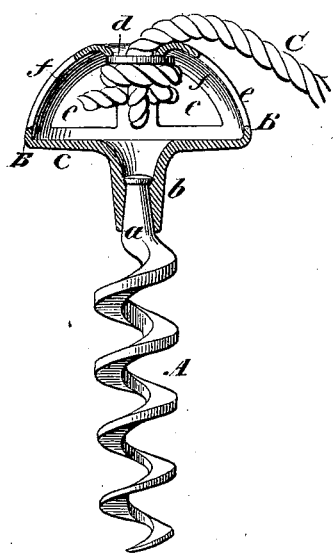
Figure 2:
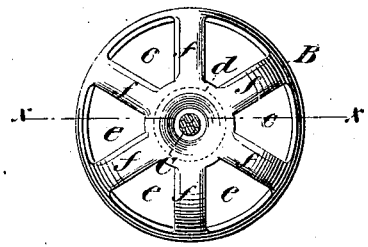

Be it known that I, PETER J. TWEED, of Blair, in the county of Washington and State of Nebraska, have invented a new and Improved Picket-Pin, of which the following is a specification:

Figure 1 is a side elevation, partly in section, of my improved picket-pin. Fig. 2 is a plan view.

Similar letters of reference indicate corresponding parts.

My invention consists in a picket-pin having a spiral or corkscrew shank and a hollow head having a central top aperture and containing a washer for receiving the rope that passes out of the top aperture, and to which the animal is hitched.

The object of the invention is to provide a picket-pin which cannot be pulled from the ground by the animal, and around which the tedder-rope cannot be wound, and in which the end of the rope is swiveled, so that it cannot become twisted, and which may be inserted into and removed from the ground without tools.

In the drawing, A is a spiral or screw having the general form of a corkscrew, which is made of a flat bar of steel or wrought-iron, having its greatest diameter at right angles to the axis of the screw. The bar is tapering, being thickest at the upper end of the screw, and gradually diminishing in thickness toward the lower end, upon which there is a chisel-edge. The object in tapering the bar is to cause it to wedge as it enters the earth, so as to form a solid bearing.

The bar from which the screw is made is somewhat thickened upon the inner edge to give it a better bearing in the ground.

The shank $a$ of the screw is riveted in the sleeve $b$, projecting from the under surface of the head B. The bore of the lower end of the sleeve diverges outwardly to receive the tapered end of the shank $a$, the extreme upper end of which is riveted down upon a shoulder formed at the middle of the sleeve. The sleeve is made tapering or conical, its larger end being uppermost, so that as the screw is forced into the ground the conical sleeve fills the hole made in the earth, and compresses it so as to form a firm bearing-surface for the upper end of the pin.

The head B of the picket-pin has a large flat and circular under surface, $c$, that comes in contact with the earth, and a convex upper surface, which is sufficiently low to permit the tedder, on being drawn in contact with it, to slide over its top, and thus prevent the rope from becoming entangled on the picket-pin.

The under surface of the head aids in supporting the picket-pin against lateral strain by holding the earth around the sleeve in its place. The upper or convex surface of the head is apertured, and on the top, around the central and circular top aperture which is to receive the tedder-rope, countersunk to provide a rounded surface for the tedder-rope to bear against.

There are apertures $e$ in the head for introducing the tedder-rope with a washer placed upon it and its end knotted, and for admitting a person's fingers.

The strips $f$ of the upper surface of the head, between the apertures $e$, have on both sides their edges turned toward the cavity in the head, to provide convenient rounded surface for the hand when inserting or removing the pin from the ground, the head being sufficiently large to admit of turning it by hand.

The knot on the end of the tedder-rope is placed in the cavity of the head, whence the rope extends out of the head through the top aperture to the animal tethered.

The washer $d$, placed upon the rope above the knot, and bearing against the inner surface of the top of the head, prevents the knot on the end of the rope from slipping through the top aperture and from becoming worn, and a safe connection between tedder-rope and picket-pin is provided.

The cavity, partly in the head B and partly in the sleeve $b$, is sufficiently large to permit the knot on the end of the rope to move without chafing. Likewise the central top aperture has a diameter greater than that of the rope, to permit the latter to move freely. The object is to permit the tedder-rope, with its knotted end and washer, to turn round in the head, so that it may not become twisted.

Having thus described my invention, I claim as new and desire to secure by Letters Patent—

1. A picket-pin consisting of a spiral or screw having a hollow convex head, in which may be swiveled a tedder-rope, as herein shown and described.

2. A picket-pin provided with a conical sleeve projecting from the under surface of its head, forming a bearing-surface for supporting the screw against lateral strain, as herein shown and described.

3. A picket-pin having a screw formed of a tapering bar, as herein shown and described, whereby the screw is thickest at its upper end and gradually diminishes in thickness toward its lower end.

PETER JOHNSON TWEED.

Witnesses:
SAM. P. THANE,
MARTIN PETERSON.